(12) United States Patent
Seder

(10) Patent No.: US 7,191,156 B1
(45) Date of Patent: Mar. 13, 2007

(54) DIGITAL WATERMARKING SYSTEMS

(75) Inventor: Phillip Andrew Seder, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 09/562,049

(22) Filed: May 1, 2000

(51) Int. Cl.
*G06Q 99/00* (2006.01)
*H04K 1/00* (2006.01)
*H04L 9/00* (2006.01)

(52) U.S. Cl. .................. 705/64; 705/26; 705/27; 705/41; 705/75

(58) Field of Classification Search ............... 705/26, 705/14, 15, 39, 67, 27, 41, 64, 75; 709/217; 713/200, 202, 176; 235/379, 493, 492; 382/100
See application file for complete search history.

(56) References Cited

U.S. PATENT DOCUMENTS

| | | | |
|---|---|---|---|
| 3,805,238 A | 4/1974 | Rothfjell | |
| 4,081,132 A * | 3/1978 | Pearce | 235/493 |
| 4,790,566 A | 12/1988 | Boissier et al. | |
| 4,820,912 A | 4/1989 | Samyn | |
| 4,879,747 A | 11/1989 | Leighton et al. | |
| 5,321,751 A | 6/1994 | Ray et al. | |
| 5,446,273 A | 8/1995 | Leslie | |
| 5,528,222 A | 6/1996 | Moskowitz et al. | |
| 5,640,193 A | 6/1997 | Wellner | |
| 5,657,389 A | 8/1997 | Houvener | |
| 5,724,424 A * | 3/1998 | Gifford | 705/79 |
| 5,740,244 A | 4/1998 | Indeck et al. | |
| 5,745,569 A | 4/1998 | Moskowitz | |
| 5,765,176 A | 6/1998 | Bloomberg | |
| 5,767,496 A | 6/1998 | Swartz et al. | |
| 5,778,102 A | 7/1998 | Sandford, II et al. | |
| 5,790,674 A | 8/1998 | Houvener et al. | |
| 5,841,886 A | 11/1998 | Rhoads | |
| 5,875,296 A * | 2/1999 | Shi et al. | 713/202 |
| 5,892,900 A * | 4/1999 | Ginter et al. | 713/200 |
| 5,905,248 A | 5/1999 | Russell et al. | |
| 5,905,800 A * | 5/1999 | Moskowitz et al. | 380/28 |
| 5,907,149 A | 5/1999 | Marckini | |
| 5,938,726 A | 8/1999 | Reber et al. | |
| 5,984,366 A | 11/1999 | Priddy | |
| 5,986,651 A | 11/1999 | Reber et al. | |
| 6,032,195 A | 2/2000 | Reber et al. | |
| 6,061,451 A | 5/2000 | Muratani et al. | |

(Continued)

FOREIGN PATENT DOCUMENTS

EP    1117246    7/2001

(Continued)

OTHER PUBLICATIONS

Ed Bott, "C is for cookie", PC/Computing, v10, n7, p. 324(1), Jul. 1997.*

(Continued)

*Primary Examiner*—Calvin Loyd Hewitt, II
(74) *Attorney, Agent, or Firm*—Digimarc Corporation

(57) ABSTRACT

A variety of systems responsive to watermarked documents are detailed. In one, watermarking is employed to facilitate e-commerce transactions. More particularly, watermarking is employed to assure that an on-line purchaser of goods has physical custody of the credit card being charged. Without such custody, the requested transaction will be refused by the credit card issuer.

12 Claims, 1 Drawing Sheet

U.S. PATENT DOCUMENTS

| | | | |
|---|---|---|---|
| 6,064,764 A | 5/2000 | Bhaskaran et al. | |
| 6,105,008 A * | 8/2000 | Davis et al. | 705/41 |
| 6,122,403 A | 9/2000 | Rhoads | |
| 6,138,151 A | 10/2000 | Reber et al. | |
| 6,179,206 B1 * | 1/2001 | Matsumori | 235/383 |
| 6,216,228 B1 | 4/2001 | Chapman et al. | |
| 6,226,752 B1 * | 5/2001 | Gupta et al. | 726/9 |
| 6,243,480 B1 * | 6/2001 | Zhao et al. | 382/100 |
| 6,270,011 B1 * | 8/2001 | Gottfried | 235/379 |
| 6,292,092 B1 | 9/2001 | Chow et al. | |
| 6,311,214 B1 * | 10/2001 | Rhoads | 709/217 |
| 6,389,151 B1 | 5/2002 | Carr et al. | |
| 6,400,272 B1 | 6/2002 | Holtzman et al. | |
| 6,408,330 B1 * | 6/2002 | DeLaHuerga | 709/217 |
| 6,496,933 B1 | 12/2002 | Nunally | |
| 6,536,665 B1 | 3/2003 | Ray et al. | |
| 6,542,933 B1 | 4/2003 | Durst, Jr. et al. | |
| 6,650,761 B1 | 11/2003 | Rodriguez et al. | |
| 6,742,712 B1 * | 6/2004 | Kawaguchi et al. | 235/492 |
| 6,748,533 B1 * | 6/2004 | Wu et al. | 713/176 |
| 6,779,112 B1 * | 8/2004 | Guthery | 713/172 |
| 6,983,057 B1 * | 1/2006 | Ho et al. | 382/100 |
| 2001/0021950 A1 | 9/2001 | Hawley et al. | |
| 2001/0037210 A1 | 11/2001 | Hirayama | |
| 2001/0051915 A1 | 12/2001 | Ueno et al. | |
| 2002/0010684 A1 | 1/2002 | Moskowitz | |
| 2002/0122568 A1 | 9/2002 | Zhao | |
| 2002/0138351 A1 | 9/2002 | Houvener et al. | |

FOREIGN PATENT DOCUMENTS

| | | |
|---|---|---|
| JP | 11098134 A * | 4/1999 |
| WO | WO97/06502 | 2/1997 |
| WO | WO01/43080 | 6/2001 |

OTHER PUBLICATIONS

Alattar, "Smart Images" Using Digimarc's Watermarking Technology, SPIE 12th Int'l Symposium on Electronic Imaging, Vo. 3971, No. 25, pp. 1-10, Jan. 2000.

Presto Developer's Kit, 2 pages, from web.archive.org copy of www.prestotech.com, Mar. 2000.

PrestoPass, One-Wave E-Commerce, 2 pages, from web.archive.org copy of www.prestotech.com, Mar. 2000.

Press Rlease, Presto Technologies, Inc. Launches PrestoPass Platform at Demo 2000; Feb. 7, 2000.

Scanlon, "The Thing Network," Wired Magazine, Feb. 2000.

* cited by examiner

DIGITAL WATERMARKING SYSTEMS

RELATED APPLICATION DATA

The subject matter of the present application is related to that disclosed in application Ser. No. 09/127,502, filed Jul. 31, 1998 (now U.S. Pat. No. 6,345,104); Ser. No. 09/074,034, filed May 6, 1998 (now U.S. Pat. No. 6,449,377); Ser. Nos. 09/343,104, filed Jun. 29, 1999; 09/503,881, filed Feb. 14, 2000 (now U.S. Pat. No. 6,614,914); and Ser. No. 09/547,664, filed Apr. 12, 2000, and in U.S. Pat. No. 5,862,260.

The subject matter of the present application is also related to that disclosed in application Ser. Nos. 09/562,516 and 09/562,524 (now U.S. Pat. No. 6,724,912), both filed herewith.

FIELD OF THE INVENTION

The present invention relates to hidden data systems, and is particularly illustrated with reference to documents employing digital watermarks.

BACKGROUND AND SUMMARY OF THE INVENTION

Digital watermarking technology, a form of steganography, encompasses a great variety of techniques by which plural bits of digital data are hidden in some other object without leaving human-apparent evidence of alteration. Many such techniques are detailed in the cited documents.

In accordance with one embodiment of the present invention, watermarking is employed to facilitate e-commerce transactions. More particularly, watermarking is employed to assure that an on-line purchaser of goods has physical custody of the credit card being charged. Without such custody, the requested transaction will be refused by the credit card issuer.

One particular embodiment is a method of conducting commerce over the internet between a user and a vendor, where the user has a credit card with a credit card number. The method includes providing the credit card number from the vendor to a credit card approval authority; and authorizing a charge to the credit card number only after demonstrating to said approval authority that the user has physical custody of the credit card. Custody can be demonstrated by sensing image data corresponding to the face of the credit card. The method may include steganographically decoding a plural-bit payload from the sensed image data, and may further include confirming a predetermined relationship between that payload and the credit card number.

The foregoing and other features and advantages of the present invention will be more readily apparent from the following detailed description, which proceeds with reference to the accompanying drawings.

DETAILED DESCRIPTION

Figure 1:
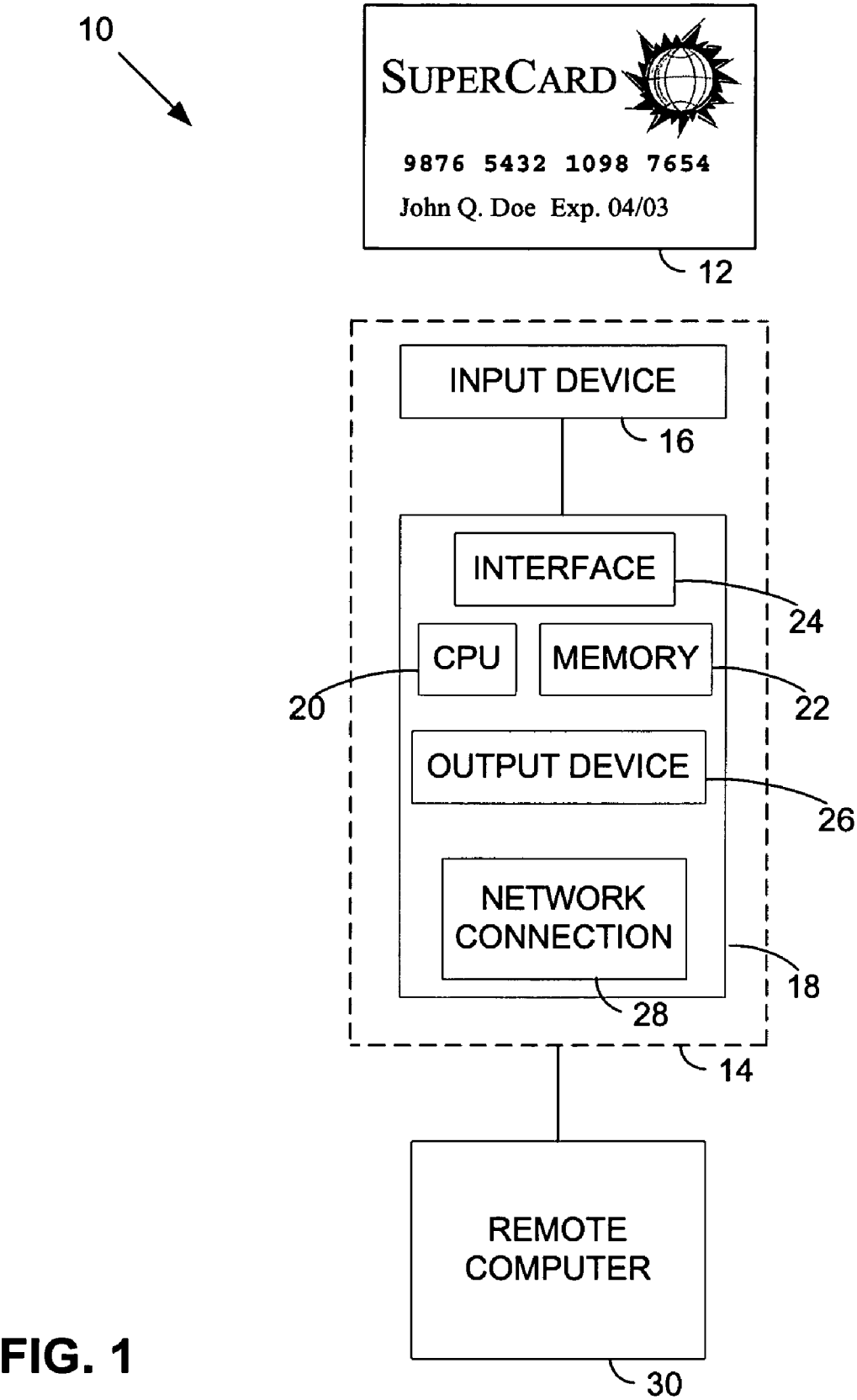
FIG. 1 shows a system according to an illustrative embodiment of the present invention.

In accordance with one embodiment 10 of the present invention, a document 12 includes plural-bit digital data steganographically encoded therein (e.g., by digital watermarking). The document can be a photo ID (e.g., a driver's license or passport), a value document (e.g., a banknote, stock certificate, or other financial instrument), a credit card, a product manual, or virtually any other type of document.

The encoding of the document can encompass artwork or printing on the document, the document's background, a laminate layer applied to the document, surface texture, etc. If a photograph is present, it too can be encoded. A variety of watermark encoding techniques are detailed in the cited patents and applications; many more are known to artisans in the field.

For expository convenience, the remainder of this disclosure focuses on photo ID cards and credit cards, but it will be recognized that the invention is not so limited.

In an illustrative embodiment, the card is encoded with a payload of 32 bits. This payload is processed before encoding, using known techniques (e.g., convolutional coding, turbo codes, etc.), to improve its reliable detection in adverse conditions. In other embodiments, a payload larger or smaller than 32 bits can naturally be used (e.g., 8–256 bits).

The encoded card is presented to a reader station 14 for reading. The reader station includes an input device 16 and a processor 18.

The input device 16 can take various forms, including a flatbed scanner, a hand scanner (including an imaging mouse), a video camera, etc.

The processor 18 can be a general purpose or dedicated computer, incorporating a CPU 20, memory 22, an interface 24 to the input device, a display screen or other output device 26, and optionally a network connection 28. The network connection can be used to connect, through an intranet, the internet, or otherwise, to a remote computer 30.

Suitable software programming instructions, stored in memory 22 of processor 18, or in a memory of remote computer 30, can be used to effect various types of functionality for embodiment 10.

One functionality is to increase security for credit card-based e-commerce transactions. Presently, all that is required to purchase goods on-line is a credit card number. Credit card numbers may be obtained illicitly in numerous ways, from dumpster diving to intercepting unencrypted internet transmissions.

In accordance with this application of the invention, a bank or other entity that issues credit cards may offer a service to its subscribers that requires physical presentment of a credit card before certain purchases (e.g., on-line purchases) can be made. If a subscriber has elected to participate in such a program, the issuer will refuse to authorize payment for any transaction in which the credit card has not been physically presented.

In one such arrangement, a subscriber's home computer, with associated web cam, serves as the reader station 14. On presenting the credit card to the web cam 16, software in the computer decodes a watermark encoded in the credit card artwork, surface texture, etc. Only if this watermark is properly decoded is the card deemed to be present.

The actual verification process can take numerous forms. In one, the credit card number is not passed to the vendor until it is locally verified by reference to the watermark data. In one such arrangement, the card number is provided to the computer in one of various ways (e.g., by typing into a web form presented by internet browser software; by serving from a secure cache, etc.). Before, or after, the computer decodes the watermark data from the physical credit card presented to the web cam. The computer then checks for a predetermined type of correspondence between the credit card number and the watermark data (e.g., the credit card number, processed by a hash function, must yield the watermark payload). Only if the watermark data and credit card number properly correspond is the credit card number transmitted from the browser to the vendor. This approach has, as one of its advantages, that the data exchange protocols between the user, the vendor, and the issuer, needn't be changed.

In another arrangement, both the decoded watermark data and the credit card number are passed to the vendor, and from the vendor to the card issuer. The card issuer can then confirm that the watermark data and credit card number correspond in a predetermined manner, and authorize the transaction if such correspondence is found. This approach has, as one of its advantages, that the correspondence check is not made at the user's computer, thereby making the verification algorithms employed more secure against hacking.

In still other arrangements, the user does not enter the credit card information at the time of the transaction. Instead, the card number may have already been stored at a remote site on the internet, e.g., at a vendor's database. A cookie stored on the user's computer may be checked by the vendor to determine the identity of the consumer, and thereby identify the corresponding credit card number.

To guard against unauthorized charging in this context, the issuer can refuse charge authorization when the card number is forwarded to it by the vendor. With its refusal, the issuer can provide an error code that indicates, to the vendor, that physical custody of the card must be demonstrated by the user before the charge will be authorized. The vendor can then query the user computer for this information. If the user has not already done so, the card can be presented to the web cam, and the decoded watermark data then passed to the vendor, and then to the issuer for confirmation of the necessary correspondence.

The back-and-forth just described can be overcome by storing data in the cookie indicating that physical presentment of that user's credit card is required before any credit card transaction can be approved. Such indicia can be added to the cookie the first time a charge authorization is refused for lack of such presentment. Thereafter, when the vendor detects such indicia in the user cookie, it can query the user for watermark data (e.g., inviting the user to present the credit card to the web cam, if necessary) before passing the transaction data to the issuer.

If this (or other) physical presentment technology becomes sufficiently widespread, standards may evolve by which vendors can discern—from data on the user's computer—whether physical presentment is required for credit card transactions. In such case, individual vendor cookies on a user's machines needn't be updated. Instead, a single datum (a cookie or otherwise)—referred to by all vendors—can be used to flag the need for presentment.

(The reference to "other" physical presentment technology anticipates that alternative arrangements may be employed to confirm user custody of a credit card. These may involve mag stripe readers, detection of other physical features, communication with a processor-, memory-, or other circuitry-embedded in a card, etc.)

The foregoing are just exemplary implementations of e-commerce arrangements requiring physical custody of the credit card. It will be recognized that there are a great number of variations on these basic themes. All, however, require physical presentment of the credit card before the credit card charge is approved.

The foregoing is just one application of the detailed technology. There are many others.

Consider, for example, the use of embedded watermark data in a document to allow access to a resource. A card may be used to grant physical access through a normally-locked door. Or a card may be used to logon to a computer network—with directory privileges tied to the data decoded from the card. (Entry of a user's PIN code, or other identity check, may be desirable in certain contexts, e.g., to guard against granting access to a person who has found or stolen someone else's card.)

In some cases, the data encoded in the card fully replicates certain information associated with the card (e.g., the bearer's last name or initials, or OCR printing, or mag stripe data, etc.). Or the encoded data can be related to other information on the card in a known way (e.g., by a hash function based on the bearer's printed name, or the full-text card contents). Or the encoded data can be unrelated to other information on the card.

In many embodiments, the data encoded in the card may serve as an index to a larger repository of associated data stored in a remote database, e.g., on computer 30. Thus, for example, an index datum read from a passport may allow a passport inspector to access a database record corresponding to the encoded data. This record may include a reference photograph of the passport holder, and other personal and issuance data. If the data obtained from the database does not match the text or photograph included on the card, then the card has apparently been altered.

To provide a comprehensive disclosure without unduly lengthening this specification, the above-detailed patents and applications are incorporated herein by references.

Having described and illustrated the principles of the invention with reference to illustrative embodiments, it should be recognized that the invention is not so limited.

For example, while the detailed embodiment employed digital watermark technology, other technologies can alternatively be employed. These include barcodes, data glyphs, RFID devices, magnetic stipes, organic transistors, smart cards, etc. Taking as a particular example the credit card presentment concept, much the same functionality can be obtained by providing an RFID device in a credit card, and providing an RFID sensor at a user's computer (e.g., in a mouse pad). To confirm custody of the credit card, the user presents the card to the RFID sensor, and the transaction proceeds as above-detailed.

The particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, I claim as my invention all such modifications as may come within the scope and spirit of the following claims and equivalents thereof.

I claim:

1. A method comprising:

scanning a document to provide document data, wherein the document data includes first plural-bit payload data that has been steganographically encoded in the document;

decoding the steganographically encoded first plural-bit payload data from the document data;

transmitting cookie data from a user computer to a remote computer, and by reference to said cookie data, retrieving second data, said second data corresponding to said cookie data:

verifying the decoded first plural-bit payload data against the retrieved second data; and, performing an action facilitated by the document based at least in part on the verification.

2. The method of claim 1 wherein the second data is associated with the document.

3. The method of claim 2 wherein at least part of the second data is printed on said object.

4. The method of claim 2 wherein at least part of the second data is encoded on a mag stripe on said document.

5. The method of claim 1 wherein said checking includes performing a hashing operation on at least part of the second data, and checking said hash for a match with said decoded first data.

6. The method of claim 1 that includes retrieving at least part of the second data from a cache on a user's computer.

7. The method of claim 1 that includes transmitting information related to the first and second data to a remote computer, and checking at said remote computer to verify said expected correspondence.

8. The method of claim 1 wherein the document is a credit card.

9. The method of claim 8 that includes transmitting information related to the first data to a remote computer, and checking the first data for said correspondence with at least part of second data stored at said remote computer.

10. A system for use by a consumer to make purchases over the internet, the system comprising:

a storage medium for storing a data record indicating whether physical presentment of a card is required prior to completing purchases from said system;

a processor for reading the data record and, based on the data record, requiring physical presentment of the card prior to completing such purchases;

a transmitter for transmitting cookie data to a remote site to obtain data used to verify the card; and a steganographic decoder for verifying the physical presentment of the card based on steganographic data decoded from the card.

11. The system of claim 10 including an RFID reader operable to read data from the card used to verify physical presentment of the card.

12. The system of claim 10 including a mag stripe reader operable to read data from the card used to verify physical presentment of the card.

* * * * *